United States Patent [19]

Crusco

[11] Patent Number: 4,629,220

[45] Date of Patent: Dec. 16, 1986

[54] METHOD AND APPARATUS FOR QUICK-COUPLING CONNECTING NIPPLE FOR PLASTIC PIPE

[75] Inventor: Juan C. Crusco, Houston, Tex.

[73] Assignee: Cruway, Inc., Houston, Tex.

[21] Appl. No.: 527,186

[22] Filed: Aug. 29, 1983

[51] Int. Cl.$^4$ .............................................. F16L 33/20
[52] U.S. Cl. .................................... 285/238; 285/256; 285/423; 285/921; 285/373; 29/453; 29/511
[58] Field of Search ............... 285/256, 259, 238, 423, 285/382, DIG. 22, 373, 921; 29/453, 511, 517

[56] References Cited

U.S. PATENT DOCUMENTS

| | | | |
|---|---|---|---|
| 1,926,270 | 9/1933 | Eastman | 285/259 |
| 2,687,904 | 8/1954 | Tornblom | 285/256 X |
| 4,310,184 | 1/1982 | Campbell | 285/423 X |
| 4,381,594 | 5/1983 | Levande | 285/256 |

FOREIGN PATENT DOCUMENTS 1164928 10/1958 France ................................. 285/256

OTHER PUBLICATIONS

Polygroove Polyethylene Pipe, 2 pages, 4/1980, Pipe Systems Inc.

*Primary Examiner*—Dave W. Arola
*Attorney, Agent, or Firm*—Dodge, Bush & Moseley

[57] ABSTRACT

A pipe connection in which an improved method and apparatus for forming a quick-coupling connecting nipple for plastic pipe is disclosed. A plastic pipe section having an annular groove perpendicular to the axis of the pipe is disposed about the periphery of the pipe section at a longitudinal distance from the first end of the pipe section. A steel sleeve is friction fitted about the plastic pipe section and a groove is rolled about the outer periphery of the sleeve to present an annular shoulder disposed within the inner periphery of the sleeve. The shoulder of the sleeve snaps into the groove of the plastic pipe section. The other end of the sleeve is crimped inwardly into the pipe surface so that the sleeve is substantially flush with the outer diameter of the pipe section.

11 Claims, 6 Drawing Figures

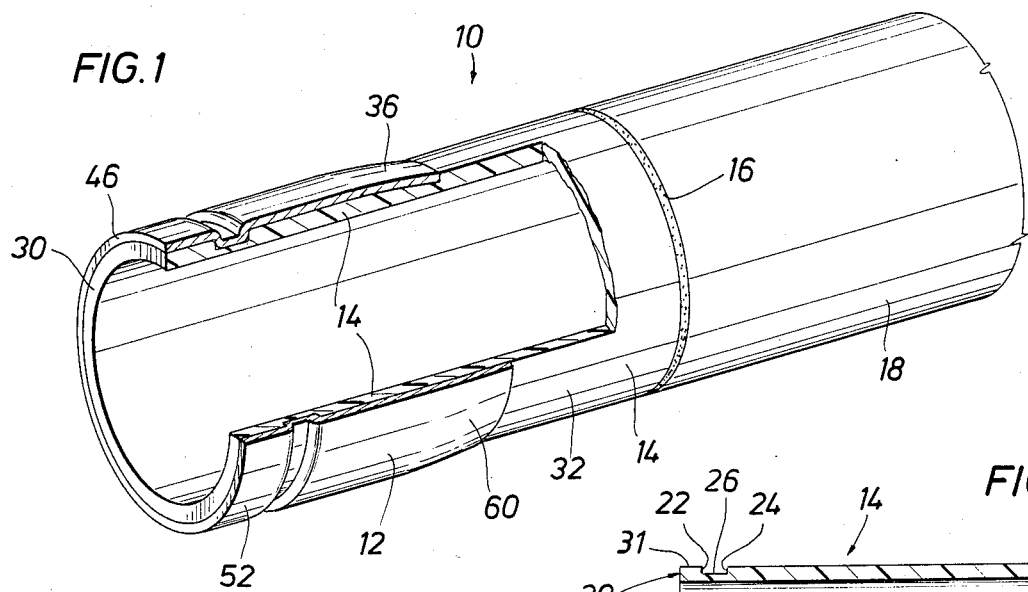
FIG. 1
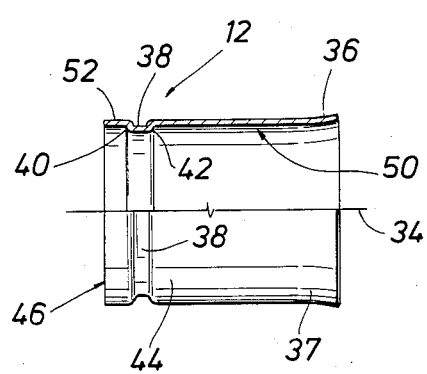
FIG. 3
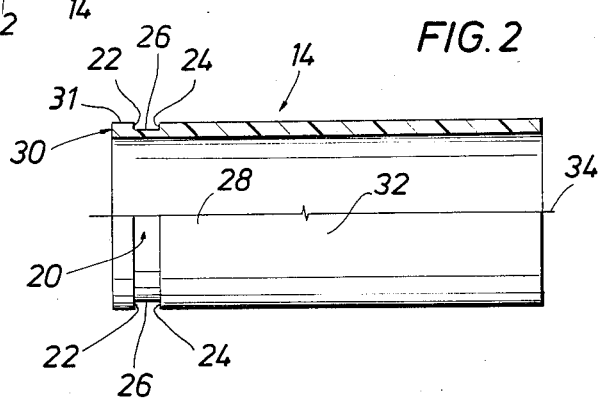
FIG. 2
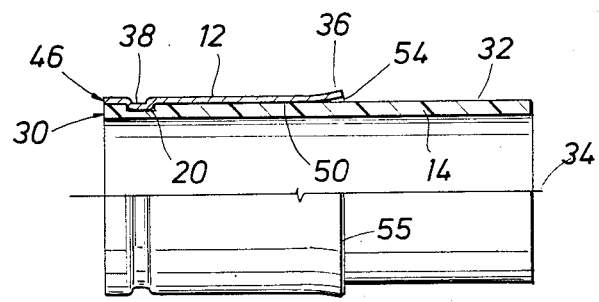
FIG. 4
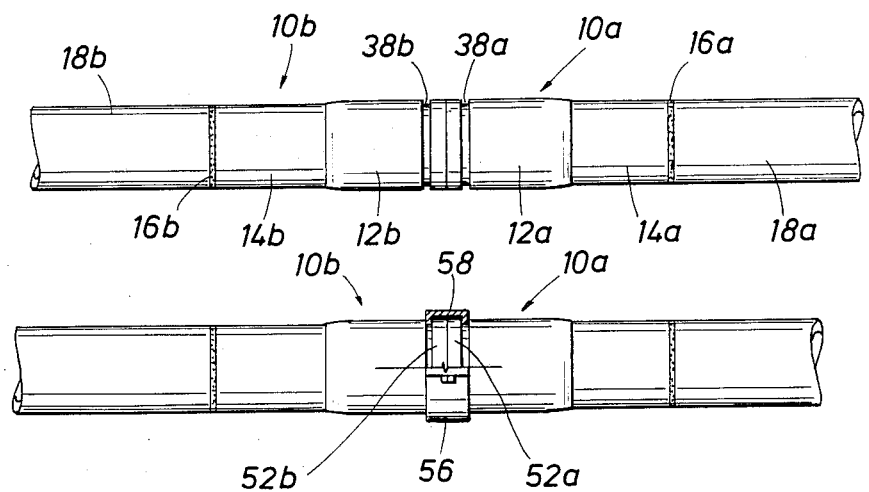
FIG. 5
FIG. 6

METHOD AND APPARATUS FOR QUICK-COUPLING CONNECTING NIPPLE FOR PLASTIC PIPE

BACKGROUND OF THE INVENTION

1. Field of the Invention

This invention relates generally to pipe connections and more particularly to an improved method and apparatus for forming a quick-coupling connecting nipple for plastic pipe.

2. Description of the Prior Art

The use of plastic pipe has gained growing acceptance in many industries over steel pipe because of its favorable features. Illustrative, but not exhaustive, of some applications are oilfield and open mine pit pumping, underground air and water piping, temporary piping and dredge piping. Plastic pipe is seventy percent lighter than steel and is therefore preferable for handling and installation. Plastic pipe has also proved to be abrasion-proof and corrosion-resistant in a chemical environment. Also, plastic pipe can withstand extreme temperature flexing and cold bending thereby making it more attractive for use over steel pipe. Two particular types of plastic pipe widely used are polyethylene pipe and polypropylene pipe.

Because of the advantageous features of plastic pipe which demand that it be used in long lengths, it has become necessary to develop a means to quick-couple lengths of the pipe. Because of the inherent material characteristics of ductility and elasticity of polypropylene and polyethylene pipe, a rigid sleeve is required in the coupling. Current coupling techniques use a steel sleeve secured on the end of the plastic pipe. An example of the prior art is the "POLYGROOVE" TM polyethylene pipe and connection manufactured by Pipe Systems, Inc. of St. Louis, Mo. The POLYGROOVE TM connection includes a steel sleeve with two annular rolled grooves provided thereon which is glued to the end of the plastic pipe.

The edge of the sleeve presents an annular shoulder outwardly from the nominal diameter of the pipe. Such a shoulder presents a disadvantage in the art of connecting plastic pipe because it may be exposed to snagging thereby precipitating loosing or removal of the steel sleeve from the plastic pipe in handling and installation. This loosening presents opportunities for passages to be formed between the sleeve and the pipe allowing effluent and influent leakage of fluids. It is obvious that leaky pipe connections would make the use of plastic undesirable. Therefore, an improved low cost method and apparatus for forming nipple connections with a rigid sleeve secured to the ductile and elastic pipe has been required.

It is, therefore, an object of the present invention to provide an improved method and apparatus for effectively and efficiently forming a connecting nipple for a quick-coupling plastic pipe connection which is not subject to the disadvantages discussed above.

More specifically, it is an object of this invention to provide an improved method and apparatus as aforesaid wherein a metal sleeve is secured to plastic pipe by a friction fit.

Another object of this invention is to provide an improved method and apparatus as aforesaid where the end of the metal sleeve is crimped onto the plastic pipe thereby eliminating a shoulder on the sleeve.

Still another object of this invention is to provide an improved method and apparatus as aforesaid which eliminates leaking of the nipple through passages between the sleeve and said pipe and by crimping the outer surface of the sleeve flush to the outer surface of the plastic pipe.

Yet another object of the invention is to provide an improved method and apparatus as aforesaid which allows the use of the quick-coupling connection with polyethylene or polypropylene pipe that can withstand high fluid pressures.

SUMMARY OF THE INVENTION

In accordance with the invention, an improved method and apparatus for forming a connecting nipple for use with a quick-coupling plastic pipe connection is disclosed. The connecting nipple has a single annular groove thereon presenting a means by which a clamp may engage in order to couple the nipple with an adjacent connecting nipple.

The apparatus and method according to the invention provides an annular groove in the plastic pipe cut at a selected longitudinal distance from its end. The groove is cut about the periphery of the pipe perpendicularly to its longitudinal axis. The steel sleeve has a rolled annular groove thereon at a longitudinal distance from its end. An annular shoulder on the inside of the sleeve forms as a result of the groove rolled about the periphery of the outside of the sleeve. The groove in the steel sleeve is identical to that of the pipe groove so as to allow alignment of the inner shoulder of the sleeve with the groove of the pipe when the sleeve is secured on the pipe.

The end of the sleeve opposite the grooved end is flared outwardly by means of a specially designed mandrel. The flared end of the sleeve is then axially aligned with the plastic pipe on a hydraulic press. Because of the interference fit used between the inner radius of the sleeve and the outer radius of the pipe, high axial pressures between sleeve and pipe are required to press the sleeve onto and about the pipe. The sleeve is pressed onto the pipe until its end is flush with that of the pipe and the annular neck on the inside of the sleeve snaps into the groove of the plastic pipe.

Axial pressures in the range of fifty (50) tons per square inch are used to press the sleeve onto the pipe. The required axial pressure depends upon the diameter and length of the sleeve, in addition to the interference fit discussed above. As a result of the interference fit, after the sleeve is radially pressed into the pipe, a friction fit is presented along the length of the sleeve in contact with the pipe.

According to the invention, the outwardly flared end of the metal sleeve is crimped onto the plastic pipe so as to present a substantially flush outer surface between the sleeve and the remainder of the plastic pipe not covered by the sleeve and to provide a fluid tight seal. It is a feature of the invention that radial pressing of the sleeve into the end of the pipe additionally forms the sleeve in a rounded shape aiding in the above mentioned friction fit.

After the process for securing the sleeve to the plastic pipe has been done as described above, a nipple is presented on a plastic pipe that eliminates leaking of the nipple and eliminates an exposed shoulder subject to snags.

DESCRIPTION OF THE DRAWINGS

The objects, advantages and features of the invention will become more apparent by reference to the drawings which are appended hereto and wherein like numerals indicate like parts and wherein an illustrated embodiment of the invention is shown of which:

FIG. 1 is a perspective view of a connecting nipple employing the present invention broken away to reveal a sleeve secured to the end of a pipe section;

FIG. 2 is a horizontal sectional view of the end of the pipe section shown in FIG. 1, illustrating the cut annular groove thereon;

FIG. 3 is a horizontal sectional view of the metal sleeve illustrating the rolled annular groove, the internal annular shoulder and the flared out end of the sleeve;

FIG. 4 is a horizontal sectional view of the sleeve as shown in FIG. 3 secured to the end of the pipe section shown in FIG. 2 illustrating the engagement thereof and also illustrating the flared out end prior to its crimping;

FIG. 5 is a side elevational view of two connecting nipples and their corresponding pipe sections heat fused thereon similar to the nipple shown in FIG. 1; and FIG. 6 is a side elevational view similar to FIG. 5 further illustrating the coupling device used to secure both connecting nipples in a fluid tight relationship.

DETAILED DESCRIPTION OF THE INVENTION

The connecting nipple 10 embodying the present invention is shown in detail in FIGS. 1 through 6. Turning first to FIG. 1, the preferred emboidment of a connecting nipple 10 including a metal sleeve 12 secured to butt plastic pipe section 14 is illustrated in the broken view. Preferably the sleeve is fabricated of steel while the plastic pipe may be of polyethylene or polypropylene. The butt pipe section 14 is heat fused at joint 16 to pipe section 18 thereby achieving the required length of pipe section.

Turning now to FIG. 2, the butt pipe section 14 is shown in horizontal sectional view showing generally a cut annular groove 20 thereon. The cut annular groove 20 presents a first annular shoulder 22 and a second annular shoulder 24 interposed by annulus 26 in a face-to-face relationship on the first end 28 of butt pipe section 14.

Turning once again to FIG. 1, an edge 30 of butt pipe section 14 is best shown which presents a face in a perpendicular plane to the longitudinal axis 34 of pipe section 14. FIG. 2 also indicates the placement of edge 30. A depending portion 31 is presented between first annular shoulder 22 and edge 30. The outer surface 32 of butt pipe section 14 in FIG. 2 is of a uniform diameter about longitudinal axis 34.

The metal sleeve 12, depicted in horizontal sectional view in FIG. 3 illustrates rolled annular groove 38 on a first end 44 and a flared out end 36 on second end 37. The rolled annular groove 38 presents a first annular shoulder 40 and a second annular shoulder 42 on the interior surface 50 of sleeve 12.

Turning once again to FIG. 1, an edge 46 is disposed at the distal end of first end 44. Edge 46 is also indicated in FIG. 3. A depending portion 52 is disposed between shoulder 40 and edge 46. The sleeve 12 and pipe section 14 are of course coaxial after the sleeve is secured to the pipe section as illustrated in FIG. 4.

Pursuant to the invention, sleeve 12 is pressed onto pipe section 14 so as to create a friction fit therebetween aligning edge 46 and edge 30 as shown in both FIGS. 1 and 4. A gap 54 is created between the surface 32 of butt pipe section 14 and interior surface 50 of flared out end 36. Edge 55 is shown in FIG. 4 in a fully exposed position relative to butt pipe section 14.

In the illustrated form, FIG. 5 presents connecting nipples adjacent to one another for coupling. For illustration purposes, the right hand side will be indicated as connecting nipple 10a and the left hand side as connecting nipple 10b. Nipple 10a is in tandem to nipple 10b so as to present the pipe sections in series to provide a conduit for fluid flow. The right hand connecting nipple 10a is comprised of butt pipe section 14a, steel sleeve 12a, rolled annular groove 38a all preferably heat fused to pipe section 18a at joint 16a. FIG. 5 further illustrates the left hand connecting nipple 10b comprised of sleeve 12b secured to butt pipe section 14b with annular rolled groove 38b thereon. Nipple 10b is preferably heat fused at joint 16b to pipe section 18b.

As is well known in the art, a quick-coupling device 56 is used to provide a fluid tight seal between connecting nipple 10a and connecting nipple 10b. As is also well known in the art, an elastomeric annular seal 58 is placed onto and around depending portions 52a and 52b in achieving this fluid tight seal. A quick-coupling device commonly used in the industry is the VIC snap-joint style 78 manufactured by Victaulic Company.

Operation

In the preferred embodiment as best shown in FIG. 1, a sleeve 12 is secured onto butt pipe section 14 to present a connecting nipple 10. This is accomplished according to the invention by an improved method of manufacture of the connecting nipple 10. A butt pipe section 14 is provided in required length and diameter whereupon an annular groove 20 is cut on a first end 28 of the pipe section 14 at a selected longitudinal displacement. The cut annular groove 20 presents a first annular shoulder 22 and second annular shoulder 24 with annulus 26 therebetween.

A metal sleeve 12 of selected length and diameter is provided so as to conform with the requirements of the invention to be discussed below.

An annular groove 38 is rolled on the first end 44 of metal sleeve 12 so as to present a first annular shoulder 40 (FIG. 3) and second annular shoulder 42 about the interior surface 50 of sleeve 12. A depending portion 52 is presented between the annular groove and the first edge 46 as best seen in FIG. 1. A mandrel is used to present a flared out end 36 on the second end 37 of sleeve 12. Any other tooling operation could be utilized to achieve the flared out end 36.

In the illustrated embodiment shown in FIG. 4, sleeve 12 is hydraulically pressed onto pipe section 14 so as to present edge 46 of sleeve 12 and edge 30 of pipe section 14 in a flush relationship. Also, rolled groove 38 of sleeve 12 is caused to snap into cut groove 20 of pipe section 14. First annular shoulder 22 of pipe 14 engages first annular shoulder 40 of sleeve 12 and second annular shoulder 24 of pipe section 14 engages second annular shoulder 42 of sleeve 12 thereby preventing longitudinal movement of sleeve 12 relative to pipe section 14 and aids in providing a fluid tight seal between sleeve 12 and pipe section 14.

It is a feature of the invention that large pressing forces are required to press sleeve 12 onto pipe section 14 as the outside surface 32 of pipe section 14 and interior surface 50 of sleeve 12 so as to provide a friction fit. Flared out end 36 is then radially pressed inwardly toward the pipe section 14 so as to crimp the flared out end 36 in a flush relationship with the outside surface 32 of pipe section 14 as best shown in FIG. 1. Flared out end 36, as shown in FIGS. 3 and 4, is required because of the interfering diameter of the sleeve 12 and pipe section 14 in order to initiate the pressing on of sleeve 12. The flared out end serves another function of crimping the sleeve to pipe section 14 thereby preventing longitudinal movement of the sleeve relative to pipe section 14 and also aiding in providing a fluid tight seal therebetween. During the crimping of flared out end 36, the forming tool utilized also performs the function of rounding sleeve 12 to a substantially cylindrical structure yet having an inwardly sloping section 36.

In accordance with a further aspect of the invention, the connecting nipple 10a, as seen in FIG. 5, is aligned with connecting nipple 10b so as to engage their end surfaces. Thereupon a quick-coupling device 56 is secured engaging the rolled annular grooves 38a and 38b. A cylindrical elastomeric seal 58 is used to provide a fluid tight seal between connecting nipple 10a and connecting nipple 10b. Cylindrical seal 58 wraps around depending portions 52a and 52b. Device 56 comprises two halves of a cylinder with two annular shoulders on each end that are received into grooves 38a and 38b.

Tests have been conducted on these nipple connections to determine their ability to withstand high pressures without experiencing leakage. A six inch HDPE, SDR 17 pipe coupling according to the invention was tested under internal pressures of four hundred ten (410) pounds per square inch and no leakages were observed. A coupled connection combination similar to that shown in FIG. 6 was tested with the quick-coupling device 56 being a VIC snap-joint style 78.

Additionally a two inch HDPE section was tested at five hundred forth (540) pounds per square inch and no leakage was detected. The quick-coupling device 56 utilized in this hydrotest was also a VIC snap-joint style 78. In both tests the water temperature was at 70° F. (21° C.).

Various modifications and alterations in the described structures will be apparent to those skilled in the art of the foregoing description which does not depart from the spirit of the invention. For this reason, these changes are desired to included in the appended claims. The appended claims recite the only limitations to the present invention and the descriptive manner which is employed for setting forth the embodiments and is to be interpreted as illustrative and not limitative.

What is claimed is:

1. A pipe structure adapted for connecting plastic pipe sections end to end, comprising:
    a plastic pipe section having an annular groove disposed in the periphery of the pipe section at a longitudinal distance from the end of the pipe section, the groove being perpendicular to the axis of the pipe;
    a rigid sleeve having an annular neck disposed about the inner periphery of the sleeve at a longitudinal distance from the first end of the sleeve substantially equal to the distance of the groove of the pipe section from the end of the pipe section; wherein the sleeve is friction fitted about the pipe section with the neck of the sleeve disposed in the groove of the pipe section; and
    the other end of the sleeve is crimped inwardly into the pipe surface so that the second end of the sleeve is substantially flush with the outer diameter of the pipe section while leaving an inner surface of the plastic pipe section free of obstruction.

2. The structure of claim 1 wherein the neck about the inner periphery of the sleeve is formed by rolling an annular groove about the exterior periphery of the sleeve.

3. The structure of claim 2 wherein the sleeve is fabricated of steel and the pipe section is fabricated of polyethylene.

4. The structure of claim 3 wherein the end of the pipe section having the sleeve fitted about it may be joined end to end to a like structure by seal means adjacent the grooves of the sleeves of the structures and a clamping means adapted to clamp about the seal means.

5. The structure of claim 1 wherein before the sleeve is fitted about the pipe section the sleeve's inner diameter is smaller than the outer diameter of the pipe.

6. The structure of claim 3 wherein the sleeve is hydraulically pressed about the exterior of the plastic pipe until the neck of the sleeve snaps into the groove of the pipe section.

7. The structure of claim 1 wherein before the sleeve is fitted about the pipe section the other end of the sleeve is flared outwardly.

8. The structure of claim 1 wherein the groove disposed about the periphery of the pipe section is formed by removing a portion of the wall of the pipe section.

9. The structure of claim 1 wherein the end of the plastic pipe section extending beyond the sleeve section may be heat welded to the end of another section of plastic pipe.

10. A method of forming a connecting apparatus for plastic pipe comprising the steps of:
    (a) rolling a groove about the periphery of the first end of a sleeve at a selected distance from the end of the sleeve with the result that an annular neck is formed about the interior of the sleeve;
    (b) flaring out the other end of the sleeve;
    (c) providing an annular groove in said pipe wherein said pipe groove is at a longitudinal distance from its first end identical to the distance of the groove in the sleeve from its first end;
    (d) pressing said sleeve on said pipe until the first ends of the sleeve and pipe are flush with one another and the neck of the interior of the sleeve snaps into the groove about the exterior of the pipe;
    (e) crimping the flared end of the sleeve into the pipe; wherein:
    (f) the inner diameter of the sleeve is smaller than the outer diameter of the pipe so as to present a friction fit between the sleeve and the pipe; and
    (g) the second end of the sleeve is crimped into the pipe until the outer diameter of the second end of the pipe is substantially flush with the outside diameter of said plastic pipe while leaving an inner surface of the plastic pipe section free of obstruction.

11. Apparatus adapted for connecting plastic pipe sections end to end, comprising:
    a plastic pipe section having an annular groove in an outer surface of the pipe section at a longitudinal distance from the end of the pipe section, the groove being perpendicular to the axis of the pipe;
    a rigid sleeve having an annular neck disposed about the inner surface of the sleeve at a longitudinal distance from the first end of the sleeve substantially equal to the distance of the groove from the end of the pipe section, the sleeve being friction fitted about the pipe section with the neck at a first end of the sleeve disposed in the groove of the pipe section; and the second end of the sleeve being crimped from a radially outwardly flared position to an inwardly position in the outer pipe surface so that the second end of the sleeve is substantially flush with the outer surface of the pipe section while leaving an inner surface of the plastic pipe section free of obstruction.

* * * * *